Patented Jan. 4, 1938

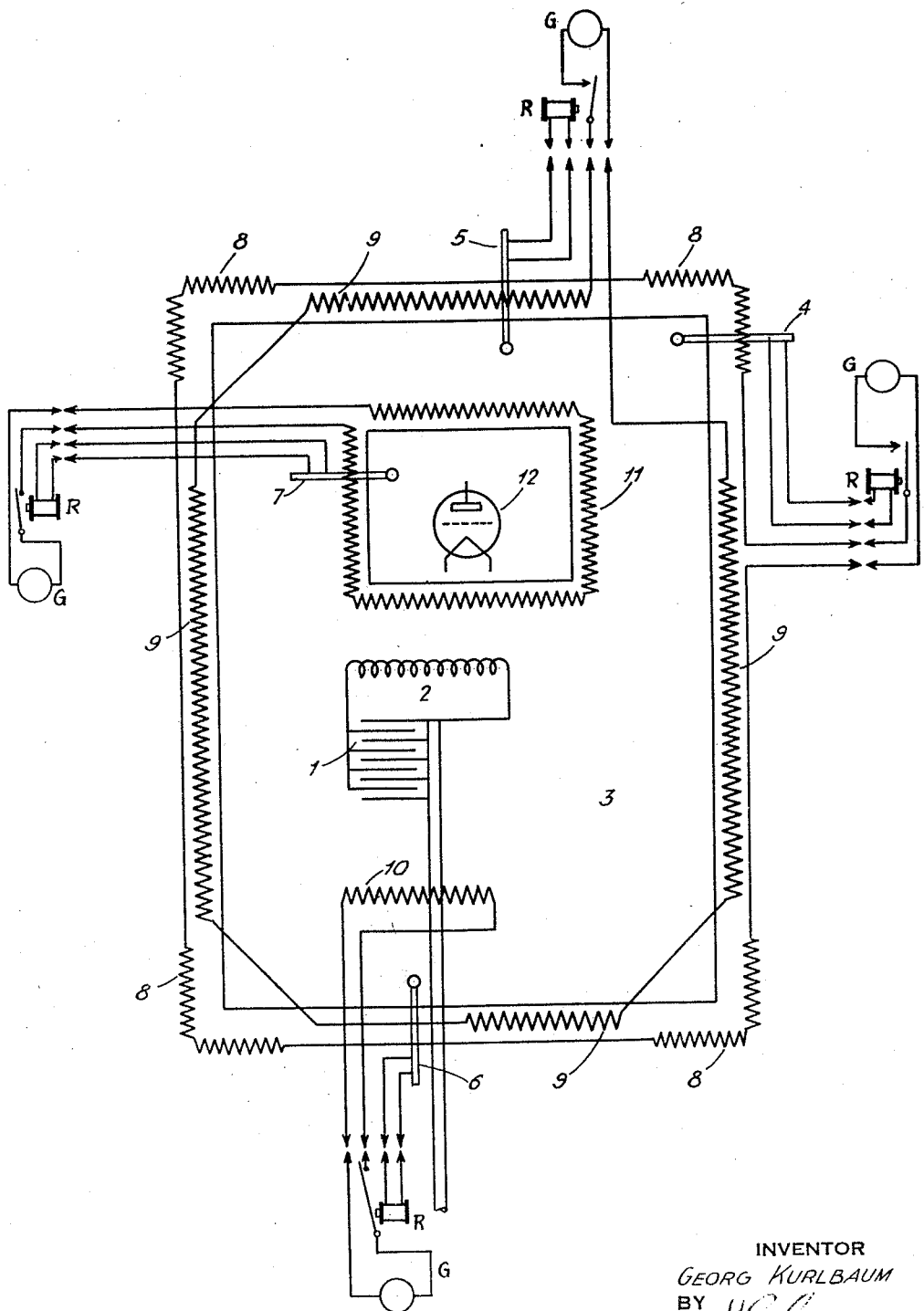

2,104,563

UNITED STATES PATENT OFFICE 2,104,563

TEMPERATURE REGULATION

Georg Kurlbaum, Berlin, Germany, assignor to Telefunken Gesellschaft für Drahtlose Telegraphie m. b. H., Berlin, Germany, a corporation of Germany Application May 7, 1934, Serial No. 724,267
In Germany June 14, 1933

6 Claims. (Cl. 219—20)

This invention relates to an improved means to stabilize the temperature of a thermostat-equipped room or enclosure.

For stabilizing the temperature in rooms, recourse is generally had to a temperature measuring instrument mounted at some suitable point inside such room, such thermometer or other temperature measuring device controlling the heat production in a heater in such a way that the room temperature will bear as little as possible a dependence upon the ambient temperature. It has been found that owing to the irregular heat radiation from the various parts of the walls of a room thermal currents and thus temperature drops, may arise within the room whose temperature is to be regulated.

Especially in relatively large boxes, such unilateral chilling is very liable to lead to a fall of temperature in the interior of the box towards that particular side thereof. If the temperature measuring instrument is not located in the center of such disturbance in the heat distribution, this means that as a result also the mean temperature of the interior of the box is altered.

According to this invention, the said temperature differences are eliminated by that a plurality of temperature measuring instruments and several heating devices are employed rather than only one of each. What is thus accomplished is that parts of the room or space which are characterized by increased heat radiation, for instance, sharp corners or points where the wall of the room or other enclosure is broken or apertured, will be maintained at a stable and constant temperature in spite of the fact that the thermal radiation lies above the average. For this purpose, it is suitable to provide a temperature measuring instrument at such points, which controls the heat production in a heater device located in the direct neighborhood.

Under certain circumstances it may be of advantage to make the regulator temperatures in the various thermostats slightly different; most particularly if the various apparatus located inside the enclosure require for their operation somewhat different temperatures the said measure may be of advantage. In this case, to be sure, the regulation temperatures in every part of the enclosure are constant, but they need not be equal to one another.

One exemplified embodiment of the basic idea of the invention is shown in the case of an electric oscillator of high frequency stability illustrated by the accompanying drawing. Oscillators of extremely high frequency constancy are of great value in radio work. The oscillation circuit comprising the condenser 1 and the coil 2 are confined inside the space 3. 4, 5, 6, 7, are temperature measuring means which serve to control the thermal evolution in the respective heater devices 8, 9, 10, 11, in accordance with some known method, for example, by a relay "R" being connected to the temperature measuring means for actuating contacts which are connected in series with the heater devices and electrical supply source "G". In order that a uniform temperature may be secured throughout the whole space or enclosure, the corner points of the box which exhibit a particularly pronounced tendency to cool are surrounded by the heater devices 8 which are maintained at a stable and constant temperature by means of a joint temperature measuring instrument 4 consisting in the present instance of a contact-type thermometer. The rest of the outside surface of the enclosure to be kept at a constant temperature is surrounded by a winding 9 which is kept at a constant temperature by the aid of the contact thermometer 5. Moreover, especially endangered or exposed points are provided with distinct temperature regulator means. For instance, the point where the spindle of the rotary condenser protrudes from the space is stabilized in its temperature by the aid of a temperature-measuring device 6 in conjunction with the heating winding 10. What is prevented by means of this arrangement is that the condenser cools off towards the outside by way of its spindle. Another case arises on account of the presence of the transmitter tube 12 which, because of its heat radiation involves the risk of occasioning a local temperature rise inside the space 3. In order to eliminate this source of trouble, part of the wall in the neighborhood of the said sending valve is provided with a distinct heating coil 11, the heating energy of which is controlled by the aid of the contact thermometer 7.

I claim:

1. In a temperature regulation arrangement for the stabilization of temperature within a box-like container, a plurality of contact type thermometers, a separate electric heating circuit controlled by each thermometer, at least one of said thermometers controlling the electrical circuit of a heating element substantially surrounding said box and a separate group of heating coils located at each corner of said box-like container having its electrical circuit controlled by at least one other of said contact type thermometers.

2. In a temperature regulation arrangement for the stabilization of temperature within a box-like container, a plurality of contact type thermometers, a separate electric heating circuit controlled by each thermometer, at least one of said thermometers controlling the electrical circuit of a heating element substantially surrounding said box, and a second contact type thermometer controlling the electrical circuit of a heating element of a plurality of heating coils located near the corners of said box-like container.

3. In a temperature regulation arrangement for the stabilization of temperature within a box-like container, a plurality of contact type thermometers, a separate electric heating circuit controlled by each thermometer, at least one of said thermometers controlling a heating element substantially surrounding said box and a separate group of heating coils located at each corner of said box-like container whose electrical circuit is controlled by at least one other of said contact type thermometers, electrical apparatus within said container a separate thermometer and heating elements located substantially adjacent the electrical apparatus, whose temperature is to be maintained constant by said thermometers controlling the electrical circuit of the heating elements.

4. In a temperature regulation arrangement for the stabilization of temperature within a box-like container, a plurality of contact type thermometers, a separate electric heating circuit controlled by each thermometer, at least one of said thermometers controlling the electrical circuit of a heating element substantially surrounding said box and a separate group of heating coils located at the corners of said box-like container having its electrical circuit controlled by at least one other of said contact type thermometers, electrical apparatus including a variable condenser located within said container whose temperature is to be maintained constant by said heating elements, and a separate heating element located substantially near the spindle of said variable condenser for maintaining the temperature of said variable condenser substantially constant.

5. In a temperature regulation arrangement for the stabilization of temperature within a box-like container, a plurality of contact type thermometers, a separate electric heating circuit controlled by each thermometer, at least one of said thermometers controlling the electrical circuit of a heating element substantially surrounding said box, electrical apparatus including a variable condenser located within said container whose temperature is to be maintained constant by said heating elements, and a separate heating element located substantially near the spindle of said variable condenser for maintaining the temperature of said variable condenser substantially constant.

6. In a temperature regulation arrangement for the stabilization of temperature within a box-like container, a plurality of contact type thermometers, a separate electric heating circuit controlled by each thermometer, at least one of said thermometers controlling the electrical circuit of a heating element substantially surrounding said box, and a separate group of heating coils located at each corner of said box-like container whose electrical circuit is controlled by at least one other of said contact type thermometers, a second container located within said first-mentioned box-like container, a transmitting tube located within said last-mentioned container, a heating element surrounding said container for said transmitting tube having its electrical circuit controlled by at least one other of said contact type thermometers than those controlling the heating elements surrounding the box and the heating elements located at the corners.

GEORG KURLBAUM.